C. J. SPILL.
SAWING MACHINE AND ART OF SAWING IVORY NUTS.
APPLICATION FILED JULY 27, 1910.
978,408.
Patented Dec. 13, 1910.
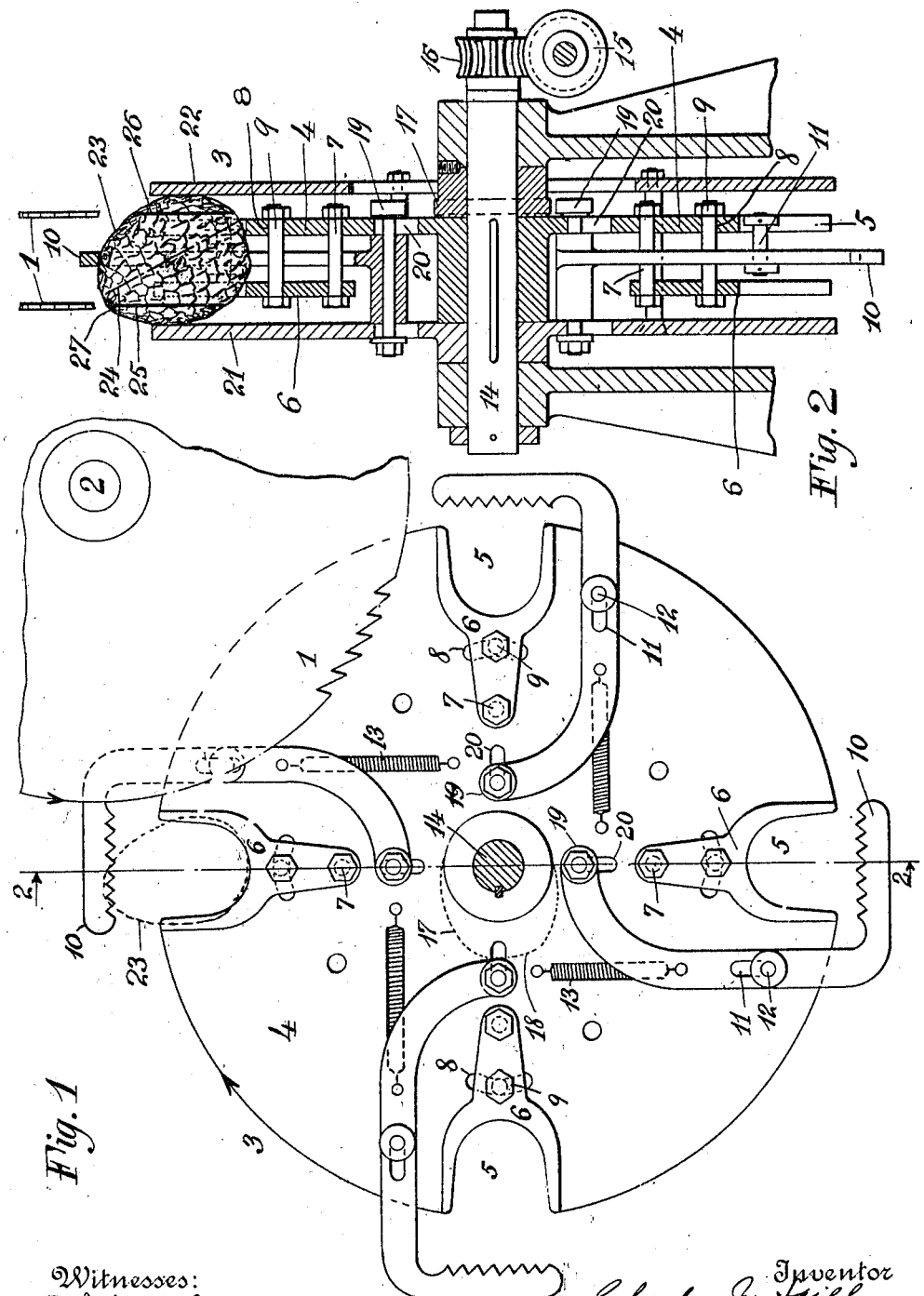

UNITED STATES PATENT OFFICE.

CHARLES J. SPILL, OF SPRINGFIELD, MASSACHUSETTS, ASSIGNOR TO UNITED BUTTON COMPANY, A CORPORATION OF NEW YORK.

SAWING-MACHINE AND ART OF SAWING IVORY-NUTS.

978,408.

Specification of Letters Patent. Patented Dec. 13, 1910.

Application filed July 27, 1910. Serial No. 574,024.

*To all whom it may concern:*

Be it known that I, CHARLES J. SPILL, a citizen of the United States, and resident of Springfield, in the county of Hampden and State of Massachusetts, have invented certain new and useful Improvements in Sawing-Machines and Art of Sawing Ivory-Nuts, of which the following is a specification.

It is the practice to grade ivory nuts, before they are sawed, according to their "diameter". This "diameter" has reference to the thickness or width of the nut. The "length" of the nut, however, varies, so that the major axis of nuts of the same diameter is not uniform.

It has been customary in the art, as heretofore practiced, to divide the nut by means of primary and secondary cuts. The primary cuts run substantially at right angles to the major axis of the nut, and the secondary cuts run at an angle to the plane of the primary cuts. By means of the primary cuts the upper and lower ends of the nut are sawed off. The upper end of the nut contains the "germ" and cannot be used and this entails a considerable loss of material. In a companion application I have disclosed a method of dividing the nuts in such a manner that the "germ" end is nullified, by making a primary cut on a line inclined with respect to the major axis of the nut, the said cut passing substantially through the "germ" end of the nut.

The present invention has for its object a method of and means for presenting the nut to the saw in such a manner that the inclined primary cut can be made.

Accordingly the invention resides in a method of and means for presenting an ivory nut to the saw inclined with respect to its major axis.

In carrying out this invention confining gages are used which are spaced apart a distance less than the minimum length of a given diameter of nut so that it is impossible for the nut to be presented to the saw at right angles to the major axis of the nut, and spaced apart a distance greater than a given "diameter" of nut. The nut is then placed between and in engagement with said gage surfaces with its length inclined to the planes of said surfaces. The nut is then clamped in position and in contact with said gage surfaces, and is then presented to a saw in a plane parallel to said surfaces.

The machine consists of a work holder for presenting the nut to the saw comprising: confining gages spaced apart for positioning the nut and means for clamping the nut so as to permit it to adjust itself in an inclined position between the gages, and a saw extending in a plane between the clamping means and one of the gages. When two saws are used they will be spaced a distance apart less than the gages and greater than the width of the clamping means.

Other features of construction will appear as the specification proceeds.

In the accompanying drawings, the invention is embodied in a concrete and preferred form, but changes of construction may be made without departing from the legitimate and intended scope of the invention.

In the said drawings: Figure 1 is a side elevation of a sawing machine embodying the invention, with the confining gages removed. Fig. 2 is a vertical sectional view on the line 2—2 of Fig. 1.

Similar characters of reference indicate corresponding parts in the different views.

3 is the workholder comprising in this instance the disk 4 provided with the notches 5 forming jaws and having opposite to each notch an idle jaw 6 pivoted at 7 and given a play by means of the slot 8 and bolt 9 so as to permit the nut to adjust itself in an inclined position. 10 is a movable jaw sliding up and down by means of the slot 11 and bolt 12 and normally held in its closed position by means of the spring 13. This disk 4 is mounted on the shaft 14 driven in any suitable manner as by means of the worm 16 and worm gear 15.

17 is a fixed cam whose high point 18 automatically opens the jaw 10 by acting against the roll 19 attached to the inner end of the jaw and sliding in the slot 20.

Two confining gages 21 and 22 are utilized moving with the disk 4 and spaced a distance apart which is less than the minimum length of a given diameter of nut and greater than the "diameter" of the nut, and embracing the nut substantially at right angles to the jaws of the workholder. In this manner when the nut 23 is inserted in the jaws it will be forced to assume a slantwise position between the gages and will be presented inclined with respect to its major axis 24 to the saw.

The rotary saw 1 is suitably mounted on the shaft 2 and driven in any suitable manner and consists, in this instance, of two saw blades which are parallel to the planes of the confining gages. When one saw blade is employed it will extend in a plane between one of the gages and the jaws, and when two saw blades are used they will be spaced apart a distance less than the gages and greater than the width of the jaws.

In practice the nut is placed between the confining gages in a position inclined to the planes of said surfaces and in contact therewith. The nut is then clamped in said position and presented to the saw in a plane parallel to said gage surfaces.

What is claimed is:

1. The improvement in the art of sawing ivory nuts which consists in providing gage surfaces spaced apart a distance greater than the "diameter" of the nut and less than the "length" thereof, the placing of the nut between and in engagement with said surfaces with its length inclined to the planes of said surfaces, the clamping of the nut in said position and in contact with said gage surfaces, and the presentation of the nut to a saw in a plane parallel to said surfaces.

2. In a machine for sawing ivory nuts, a work holder for presenting the nut to the saw comprising: confining gages spaced apart for positioning the nut and means for clamping the nut so as to permit it to adjust itself in an inclined position between the gages, and a saw extending in a plane between the clamping means and one of the gages.

3. In a machine for sawing ivory nuts, a work holder for presenting the nut to the saws comprising: confining gages spaced apart for positioning the nut and means for clamping the nut so as to permit it to adjust itself in an inclined position between the gages, and two saws spaced a distance apart less than the gages and greater than the width of the clamping means.

Signed at Springfield in the county of Hampden and State of Massachusetts this 7th day of July A. D. 1910.

CHARLES J. SPILL.

Witnesses:
EULAR B. LANE,
GURDON W. GORDON.